(12) United States Patent
Spearman et al.

(10) Patent No.: US 9,559,570 B2
(45) Date of Patent: Jan. 31, 2017

(54) ELECTRICAL MACHINE

(75) Inventors: Tim Spearman, Chelmsford (GB); Mike Dowsett, Basildon (GB); Toby Heason, Leicester (GB); Wayne Maddison, Coventry (GB); Stephen Knight, Billericay (GB)

(73) Assignee: Controlled Power Technologies, Ltd. (GB)

( * ) Notice: Subject to any disclaimer, the term of this patent is extended or adjusted under 35 U.S.C. 154(b) by 964 days.

(21) Appl. No.: 13/063,457

(22) PCT Filed: Sep. 16, 2009

(86) PCT No.: PCT/GB2009/051204
§ 371 (c)(1),
(2), (4) Date: May 3, 2013

(87) PCT Pub. No.: WO2010/032050
PCT Pub. Date: Mar. 25, 2010

(65) Prior Publication Data
US 2013/0207490 A1 Aug. 15, 2013

(30) Foreign Application Priority Data
Sep. 18, 2008 (GB) .................................. 0817078.9

(51) Int. Cl.
*H02K 11/00* (2016.01)
*F02N 11/04* (2006.01)
*H02K 5/22* (2006.01)
*H02K 11/04* (2016.01)

(52) U.S. Cl.
CPC ........... *H02K 11/0073* (2013.01); *F02N 11/04* (2013.01); *H02K 5/225* (2013.01); *H02K 11/01* (2016.01); *H02K 11/048* (2013.01); *H02K 11/33* (2016.01); *F02D 2400/18* (2013.01); *F02D 2400/21* (2013.01); *F02D 2400/22* (2013.01); *F02N 2250/08* (2013.01)

(58) Field of Classification Search
CPC ........ H02K 11/00; H02K 11/33; H02K 5/225; H02K 11/01; H02K 11/0073; H02K 11/048; F02N 11/04
USPC ......................................................... 322/89
See application file for complete search history.

(56) References Cited

U.S. PATENT DOCUMENTS 6,169,345 B1 1/2001 Bloch
6,396,161 B1* 5/2002 Crecelius ................... B63J 3/02
290/36 R
6,699,081 B1* 3/2004 Divljakovic .......... F02B 61/045
440/1

(Continued)

FOREIGN PATENT DOCUMENTS

EP          1069668          1/2001

*Primary Examiner* — Tulsidas C Patel
*Assistant Examiner* — Sean Gugger
(74) *Attorney, Agent, or Firm* — Stetina Brunda Garred & Brucker

(57) ABSTRACT

An integrated starter generator device comprising a housing, a stator and a rotor contained within the housing, the device further comprising control electronics operable to configure the device as either a starter or generator and contained entirely within the housing. The device may include a high current terminal having brass and rubber bonded together. The rubber forms both a sealing and an insulating function.

11 Claims, 13 Drawing Sheets

(56) References Cited

U.S. PATENT DOCUMENTS

| | | | |
|---|---|---|---|
| 7,180,212 B2* | 2/2007 | Anwar | H02K 11/33 310/68 R |
| 2004/0164625 A1* | 8/2004 | Grundl | H02K 5/20 310/16 |
| 2005/0045392 A1* | 3/2005 | Maslov | B60L 8/00 180/65.51 |
| 2005/0453921 | 3/2005 | Maslov | |
| 2005/0205312 A1* | 9/2005 | Bosch | F02B 67/00 180/65.1 |
| 2005/2053121 | 9/2005 | Bosch | |
| 2005/0253457 A1* | 11/2005 | Pierret | F02N 11/04 307/10.1 |
| 2005/2534571 | 11/2005 | Pierret | |
| 2011/0225806 A1* | 9/2011 | Knight | B23P 11/025 29/596 |
| 2013/0207490 A1* | 8/2013 | Spearman | F02N 11/04 310/48 |
| 2013/0278089 A1* | 10/2013 | Knight | H02K 5/20 310/54 |

* cited by examiner

ELECTRICAL MACHINE

CROSS-REFERENCE TO RELATED APPLICATIONS

The present application claims priority to International Application No. PCT/GB2009/051204 filed on Sep. 16, 2009, which claims priority to Great Britain Patent Application No. 0817078.9 filed on Sep. 18, 2008.

STATEMENT RE: FEDERALLY SPONSORED RESEARCH/DEVELOPMENT

Not Applicable

BACKGROUND OF THE INVENTION

The present invention relates to an integrated starter generator (ISG) device comprising a housing, a stator and a rotor contained within the housing. The device is preferably used in motor vehicles but may also be used in other applications. It is preferably mechanically coupled, via a pulley, to the ancillary belt of such a vehicle.

As the demand for electrical power in vehicles has increased, the trend in alternator (generator) design has been towards greater power capacity. At the same time there has been a requirement to make the alternator housing more compact, such that it takes up less space in the vehicle's engine bay.

Furthermore, a growing need for the reduction of fuel consumption by the internal combustion engine has led to the development of the Integrated Starter Generator (ISG), which represents an alternative to the conventional alternator. Like an alternator, the ISG generates electric power when the engine is running, for supplying the vehicle's electrical system and charging its battery. However, the ISG combines the functions of the conventional alternator/generator with those of the starter motor in a single ISG. Thus, it is capable of being switched from an alternator mode to a starter mode and vice versa. The weight of the ISG is typically less than that of the combined weights of separate alternator and starter motor components and the ISG can automatically stop and then rapidly restart the engine to avoid periods of unnecessary engine idling, such as when a vehicle is waiting at a traffic light. This reduces fuel consumption and exhaust emissions. Furthermore, in starter mode, the ISG is able to spin the engine at higher speeds than a conventional starter motor which further aids in fuel efficient and more reliable starting of the engine.

Like an alternator, the ISG includes a stator and rotor. However, the dual function of the ISG described above means that it requires other components in addition to those usually found in an alternator. In particular, the ISG includes various electrical components for producing the high current needed for starting the engine. Furthermore, complex electronics are necessary to control efficiently the start-stop function of the ISG or to communicate with the engine management systems of a vehicle. Moreover, the ISG faces the same requirement for compactness as the conventional alternator.

A typical belt-driven ISG (BISG) has a housing containing a rotor and a stator. The electrical connections for the rotor and stator exit the housing and lead to a separate control unit which is preferably located nearby. The rotor and stator electrical connections typically carry high currents of the order of several hundred amps and in a switched reluctance arrangement are also switched many thousands of times a second during operation. Thus the cabling between the ISG housing and the control unit is bulky, inflexible and heavy because of the high current requirements, and presents a significant EMC challenge due to the rapidly-switched high currents flowing in the cables. Furthermore, the relatively long cabling introduces electrical losses. Also, the need to mitigate these problems by minimizing the length of the cabling and mounting a control unit near to the BISG in what is typically a crowded area of an engine bay, presents further challenges. These aspects of conventional ISGs have hindered the uptake of these devices despite their significant advantages.

BRIEF SUMMARY OF THE INVENTION

According to a first aspect of the present invention there is provided an integrated starter generator device comprising a housing, a stator and a rotor contained within the housing, the device further comprising control electronics operable to configure the device as either a starter or generator and contained entirely within the housing, and a switched reluctance machine, wherein the control electronics are operable to switch the stator windings of the switched reluctance machine.

By integrating the control electronics in the housing, the need to run bulky cabling to a separate control unit is removed. Furthermore because the housing is typically manufactured from an electrically conductive material such as aluminum, the EMC generated by the switching currents is further shielded and contained by the well known Faraday-cage effect.

In a second aspect, the invention provides an integrated starter generator device including a high current terminal for receiving electrical current during the starter mode and for delivering electrical current during the generator mode, the terminal comprising a brass rod passing through an aperture in the device housing wall and a rubber coating bonded to the brass rod, the rubber coating being located between the brass rod and the edge of the aperture and arranged to act as an electrical insulator to insulate the rod from the device housing and also including one or more stepped formations to act as a seal to the edge of the aperture and to locate the terminal in the aperture.

This arrangement avoids the need for separate sealing components which would add to costs and manufacturing complexity and would introduce additional failure modes.

BRIEF DESCRIPTION OF THE DRAWINGS

Preferred embodiments of the present invention will now be more particularly described, by way of example, with reference to the accompanying drawings in which.

DETAILED DESCRIPTION OF THE INVENTION

Figure 1:
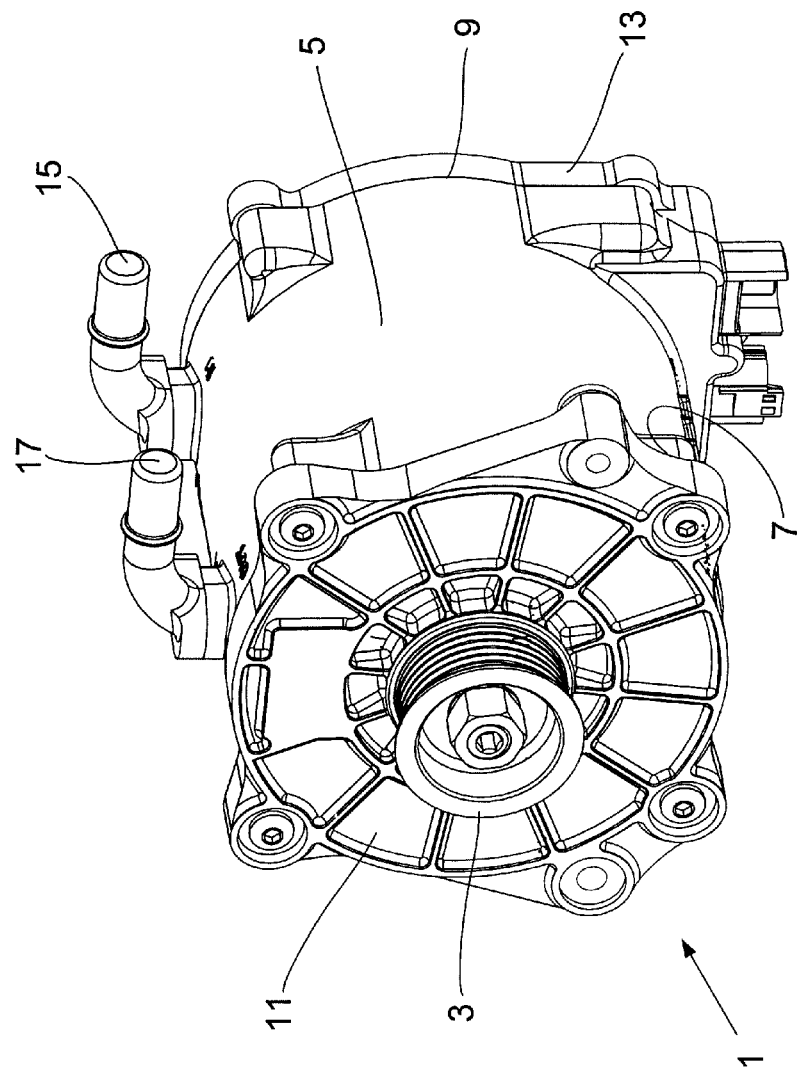
FIG. 1 shows an integrated starter generator machine (ISG) for the engine of a vehicle.
Figure 2:
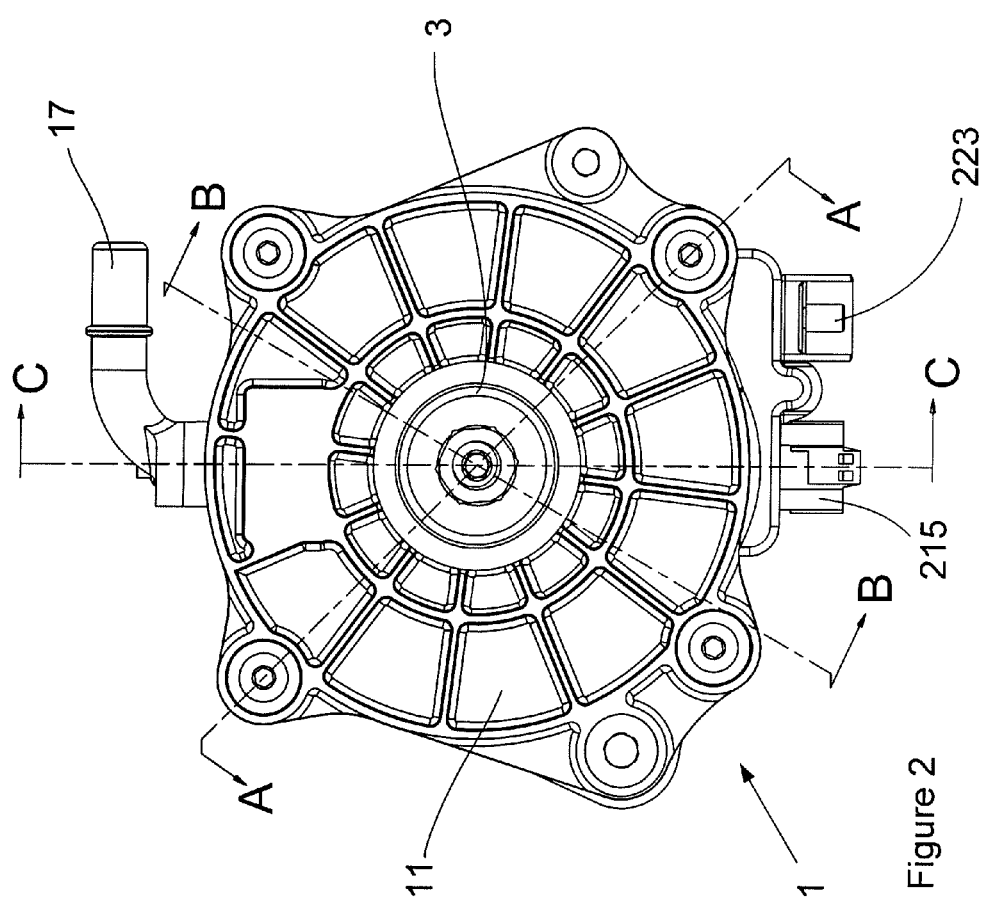
FIG. 2 shows a front elevation of the ISG of FIG. 1.
Figure 3:
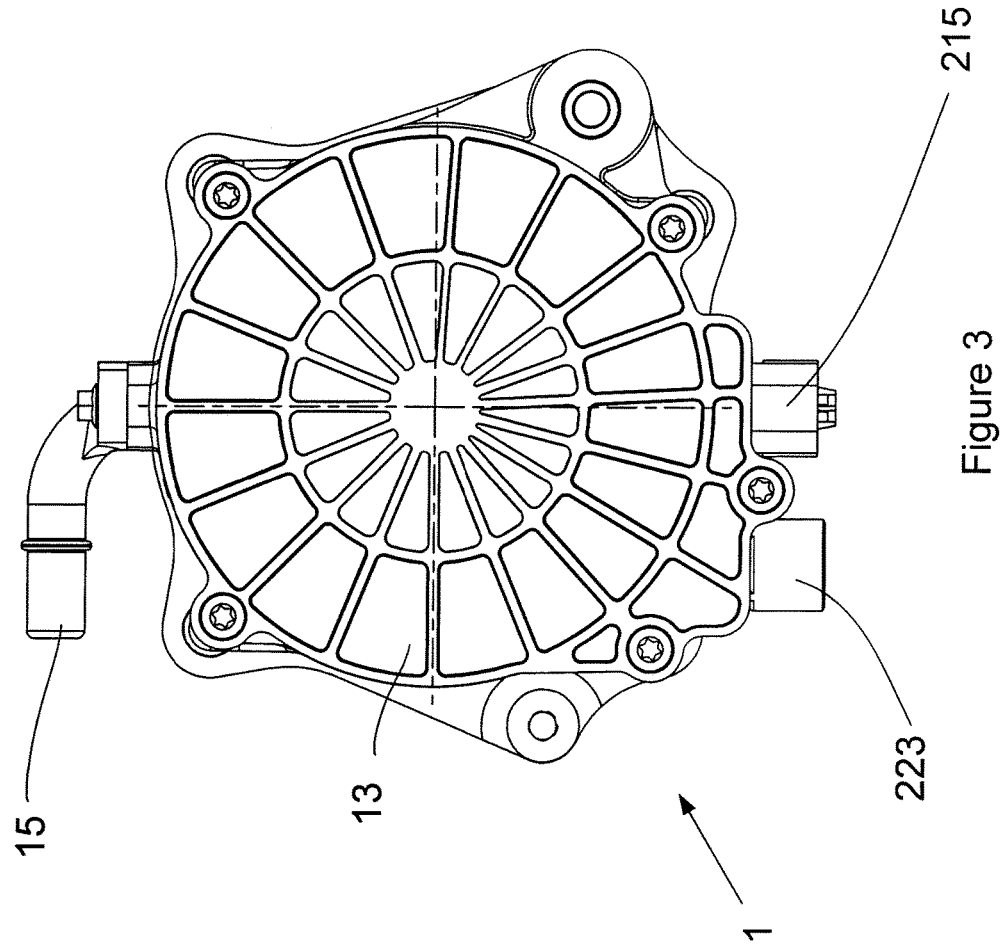
FIG. 3 shows a rear elevation of the ISG of FIG. 1.

With reference to FIGS. 1, 2 and 3, an integrated starter generator machine (ISG) 1 for the engine of a vehicle has a switched reluctance motor comprising a brushless motor with a dedicated and integrated electronic controller. It is driven by a belt (not shown) connected between a pulley 3 and the crankshaft of the engine. Torque for starting the engine is produced by the magnetic attraction of a steel rotor (not shown) to stator electromagnets. No permanent magnets are needed and the rotor carries no "squirrel cage" or windings. The 12 V ISG 1 will deliver up to 65 Nm cranking torque, 2.4 kW cranking power and 3 kW generated power.

The ISG 1 comprises a generally cylindrical, die-cast aluminum housing 5 with a front face 7 and a rear face 9. The housing 5 accommodates primarily the stator assembly and associated driveshaft and bearings. An aluminum front cover 11 is removably attached to the front face 7 of the housing 5. A rear cover 13 is removably attached to the rear face of the ISG 1. The rear portion of the housing 5 projects axially inwards to form a cavity 14 (FIG. 4) which receives electrical and electronic components and which in normal operation is closed by the rear cover 13.

Figure 5:
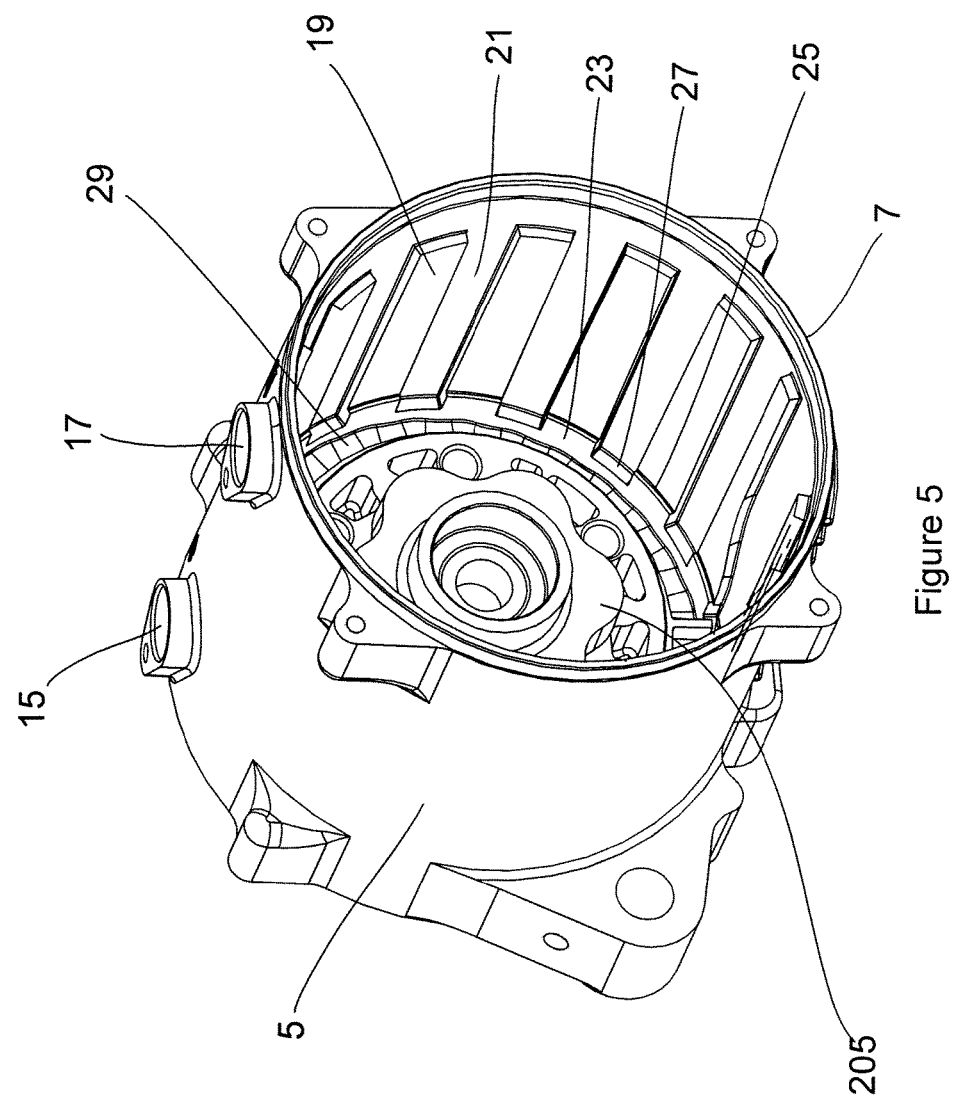
FIG. 5 shows the interior of the housing of the ISG of FIG. 1 with the front cover removed.

The ISG 1 includes cooling apparatus with inlet and outlet tubes 15, 17. The cooling apparatus utilizes liquid coolant from the engine for cooling the electrical and electronic components and the stator assembly. FIG. 5 shows the housing 5 with the front cover 11 and the rear cover 13 omitted. The interior of the housing 5 is cast with a total of 15 ribs 19 extending axially from their roots near the rear of the housing 5 towards the front, terminating short of the front face 7. In other embodiments, other numbers and arrangements of ribs may be used.

The ribs 19 are of unequal length and are arranged such that, viewed 180 degrees around the circumference of the housing 5 from the outlet tube 17, their forward most portions extend increasingly closer towards the front face 7. The ribs 19 are circumferentially spaced such as to form between them a plurality of axial channels 21. Towards the rear of the housing 5 is a cast ridge 23 extending circumferentially around the interior of the housing 5 and joining the roots of the ribs 19 together. The ridge 23 projects inwardly to form a narrow step 25 at the root of each rib, the step 25 being normal to the face of the rib 19. The ridge 23 further forms a recessed ledge 27 in each axial channel 21 between adjacent ribs 19. The recessed ledges 27 are rearward of the steps 25, hence the alternately spaced, recessed ledges 27 and steps 25 form a castellated pattern.

Towards the rear of the housing 5 and adjacent to the ridge 23 is a partition wall 29. The partition wall 29 is normal to the longitudinal axis of the housing 5 and is rearward of the recessed ledges 27 of the ridge 23. The cavity 14 containing the electrical and electronic components is on the other side (i.e. rearward) of the partition wall 29.

Figure 6:
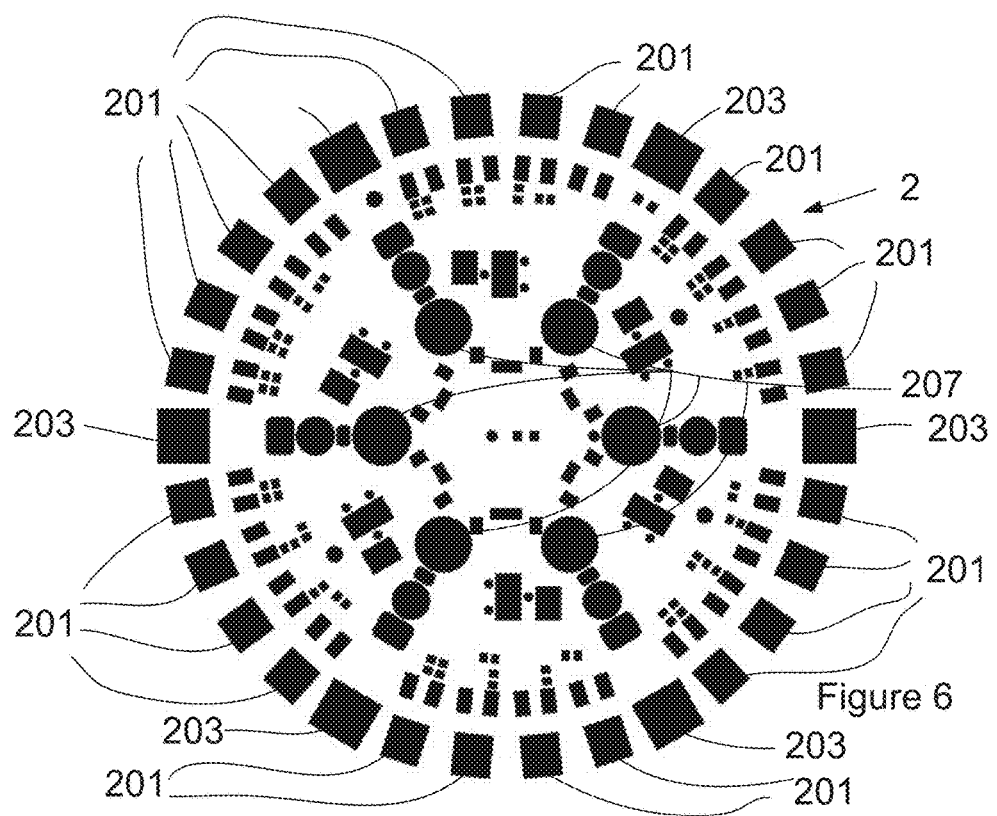
FIG. 6 shows the top mask layer of a power PCB.
Figure 7:
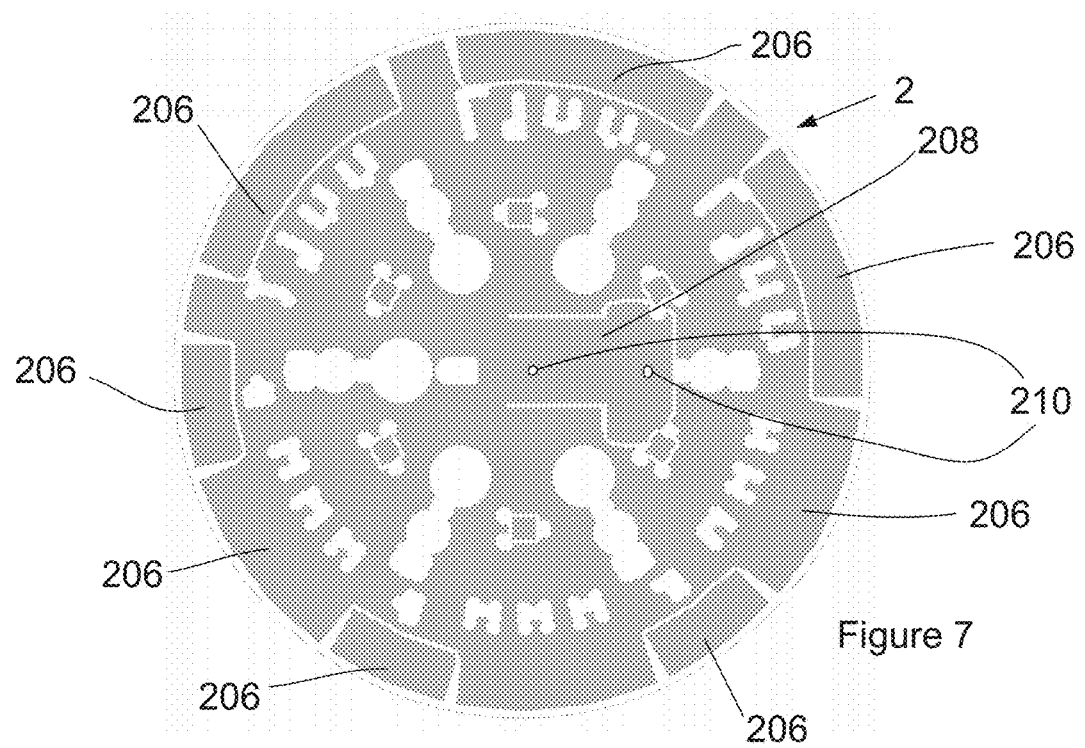
FIG. 7 shows an internal layer of a power PCB of FIG. 6.

With reference to FIGS. 6 and 7, the ISG 1 has a generally circular power printed circuit board (PCB) 2. FIGS. 6 and 7 are diagrams of some of the layers of the board and provide an understanding of the component layout of the boards. The power circuit is an H-bridge, full quadrant switching circuit using 24 power FETS to switch the three phases of the stator. The FETS 202 are thermally pasted to pads 201 which help to conduct heat away and down through the board as explained below. Slightly larger pads 203 are used to take connections from the phase windings.

As described above, the FETs 202 are arranged around the periphery of the power PCB 2. Since the FETs may be switching many hundreds of amps, the FETs generate significant heat during switching operations. The heat emitted by the electrical and electronic components in the cavity 14 at the rear of the housing 5 reaches about 400 W. The heat emitted by the stator assembly in the housing 5 reaches about 1200 W. To cool the FETs, that portion of the power PCB 2 is thermally coupled, via the thermal mat 30, to the partition wall 29 which as described briefly below, is liquid cooled.

Figure 4:
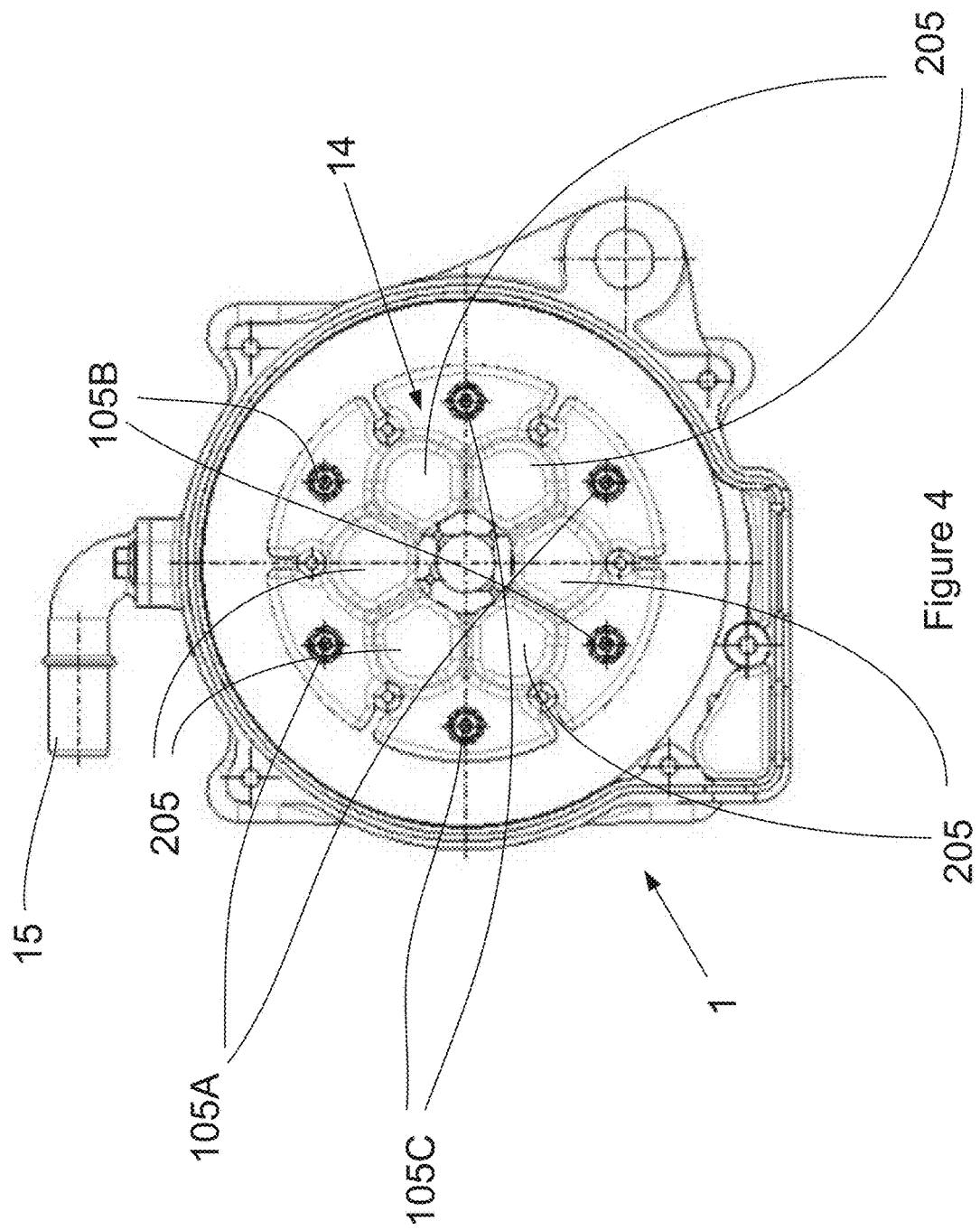
FIG. 4 shows an internal view of the elevation of FIG. 3 with the rear cover removed.

With reference also to FIG. 4, the phase windings pass through the partition wall 29 in three pairs (one for each phase). The pairs 105A deal with phase A, the pairs 105B deal with phase B and the pairs 105C deal with phase C. The windings are brought through the partition wall 29 and may be clamped using clamps attached to pads 203.

More preferably, the ends of the stator windings are crimped and an axial screw thread provided in the crimp so that the crimped winding terminations may pass through holes in the board 2 and be fixed to pads on the board using a set screw passing through the board and into the threaded crimp. This provides a compact and secure termination for the stator windings on the power PCB 2.

In view of the thermal and current carrying requirements of the board, the board is a heavy duty board with a high amount of copper. In a first embodiment, the board has four layers of 12 ounce copper (that is 12 ounces of copper per square foot). In another embodiment, the board has eight layers of six ounce copper. With reference to FIG. 7, the board has heat-sink areas 206 in each layer in registry with the pads 201 which conduct heat away from the FETs down through thermal mat 30, to the cooled wall 29.

The board is double sided and on the side opposite the FETS, large smoothing capacitors 204 are held. In view of ripple currents generated in operation, the capacitors 204 require cooling. This is achieved by inserting the capacitors 204 in wells 205 formed in the cooled partition wall 29. The capacitors 204 are thermally coupled to the wells 204 using thermal paste.

Figure 8:
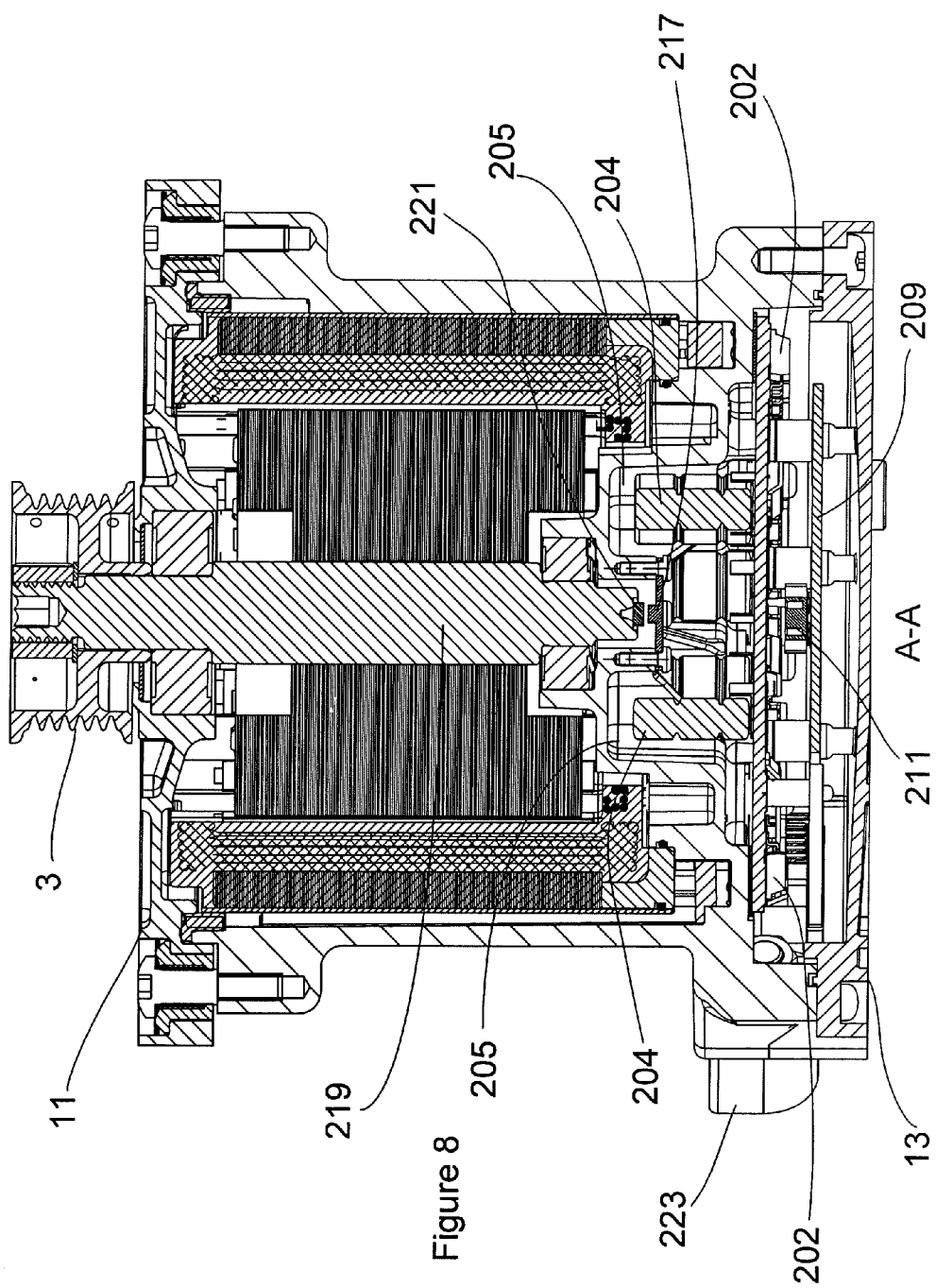
FIG. 8 shows a sectional view of the ISG of FIG. 2 along line A-A.
Figure 9:
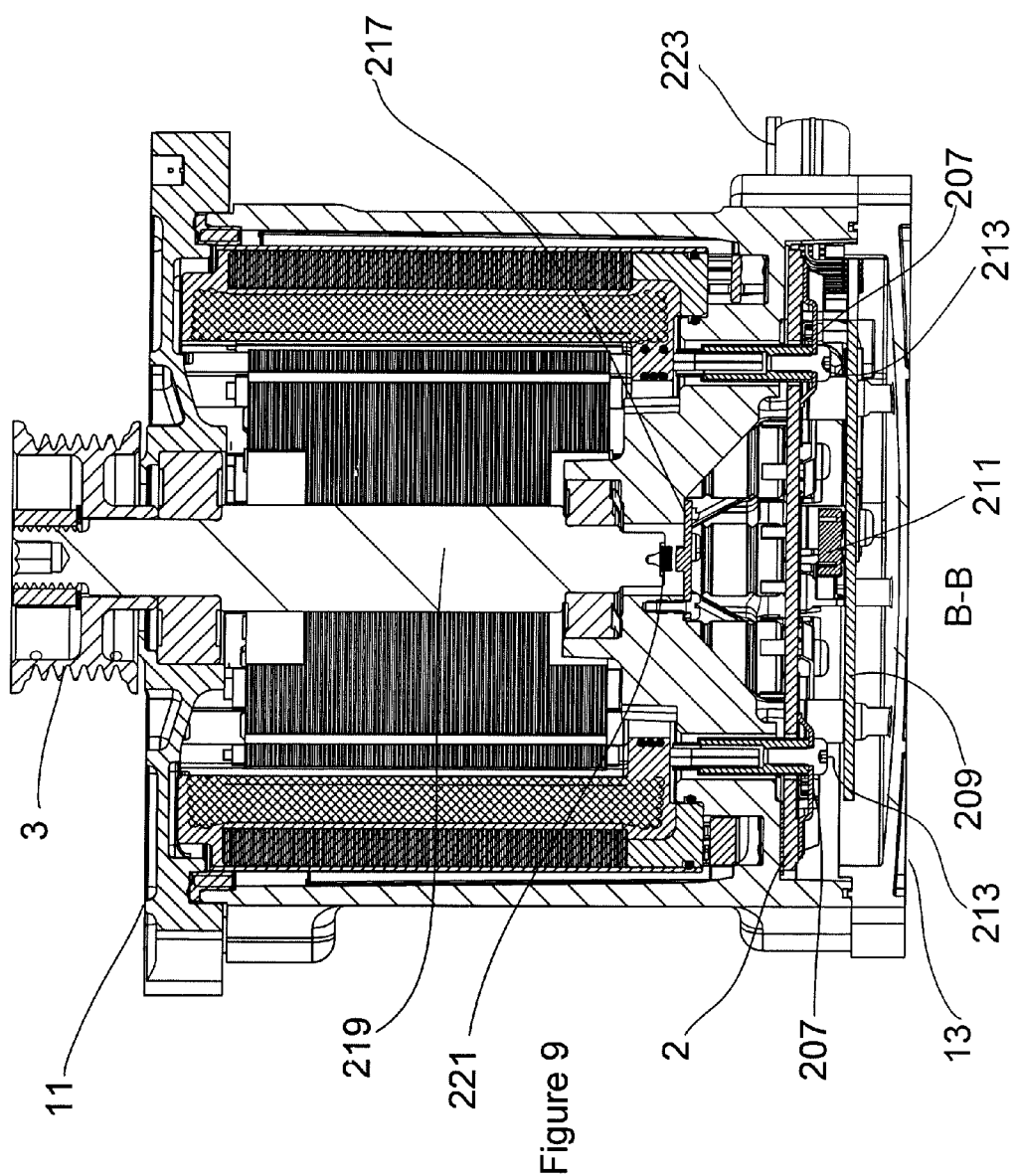
FIG. 9 shows a sectional view of the ISG of FIG. 2 along line B-B.
Figure 10:
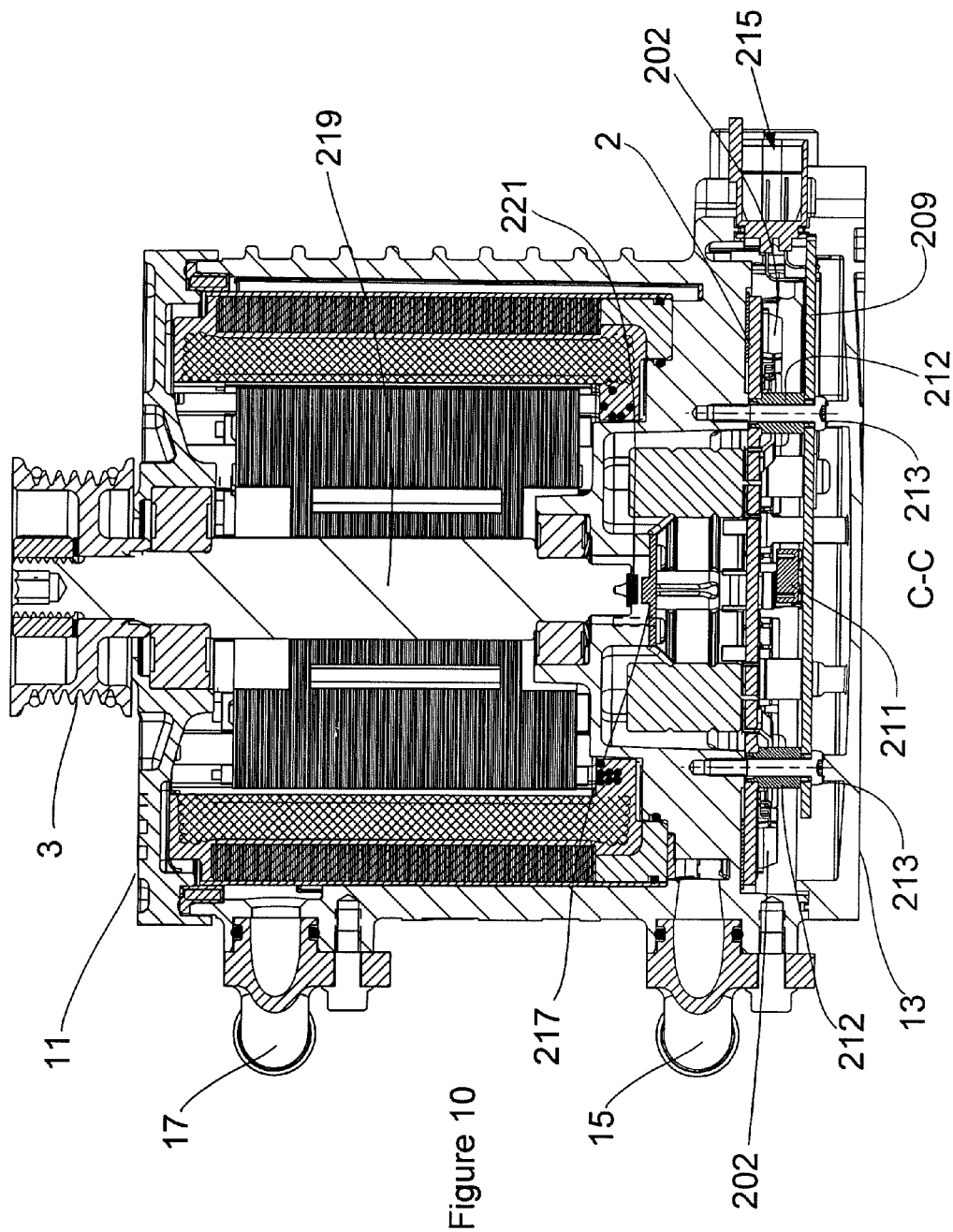
FIG. 10 shows a sectional view of the ISG of FIG. 2 along line C-C.
Figure 11:
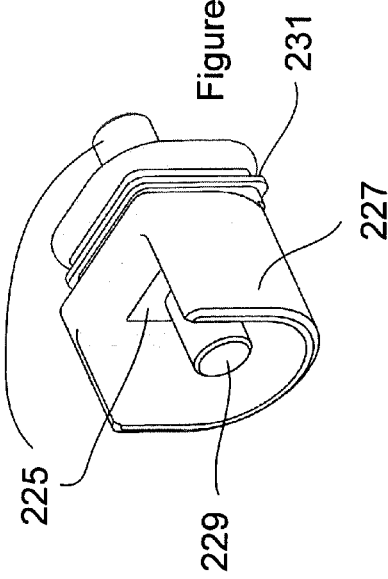
FIG. 11 shows the interior of the housing of the ISG of FIG. 1 with stator windings in place.

The board also includes a ring of six earthing points 207 which are used also as fixing points for the power board by passing screws through the holes forming the earthing points and fixing directly into the aluminum die casting of the housing (FIGS. 8, 9 and 10). At the same time, these fixings are preferably also used to mount a second (control) PCB 209 using insulated spacers 212. This control PCB 209 is electrically connected to the power PCB via a multiway connector 211 mounted on the power PCB. During assembly this connector also helps locate the control PCB 209 before screws 213 are fitted to pass through into the die cast housing 5. With reference to FIGS. 8, 9, 10 and 11, the stator assembly 301 is installed into the housing 5. The stator assembly 301 is contained within a cylindrical steel sleeve 303 which has an outer wall with an upper end 305 and a lower end 307. Stator windings 302 are contained within the sleeve 303. The sleeve 303 is inserted into the housing 5 so that its lower end 307 rests on and is supported by the steps 25 at the roots of the ribs 19.

The outer wall of the sleeve 303 contacts the faces of the ribs 19 around the circumference of the interior of the housing 5. The upper end 305 of the sleeve 303 extends towards the front face 7 of the housing 5, beyond the forward most portions of the ribs 19, thereby joining the axial channels 21 together to form a circumferential conduit 311 between the housing 5 and the outer wall of the sleeve 303, forward of the ribs 19.

Thus, the axial channels 21 between the ribs 19 are closed off along the faces of the ribs 19 by the outer wall of the sleeve 303, but remain open both at the front face 7 of the housing 5 and at the roots of the axial channels 21.

In use, the engine's water pump forces liquid coolant under pressure through the inlet tube 15 around the partition wall 29 on the opposite side to the cavity 14 and out via the axial channels 21 to the outlet 17 thereby taking heat out of the cavity 14 and the stator housing.

The velocity of the coolant through the lower chamber is approximately 0.2 to 0.55 meters per second at a volumetric flow rate of approximately 2 liters per minute. This is optimal in terms of heat extraction from the electrical and electronic components. It also reduces the possibility of coolant contaminants becoming embedded in this critical cooling area.

The control PCB 209 has a control terminal 215 which exits the die cast housing and is used as a connection into the vehicle communication buses. This may be used for example to provide status information about the ISG 1 to the engine management system and may also be used to allow the engine management system to control parameters such as output voltage and current during generator operation and also to control starting torque and speed during starter operation.

The control board 209 also includes a single ended primary inductor convertor (SEPIC) to provide an independent operating voltage for the control circuitry. This then allows the generator to generate a voltage selectable by the control board whilst still allowing the control board to function with its own independent power supply voltage.

The power board 2 also includes an area 208 (FIG. 7) which is of predetermined resistivity.

Vias 210 provide connectivity into this region so that the control board 209 is able to determine current flow through the machine.

The ISG also includes a third small PCB 217 mounted adjacent the end of the rotor shaft 219. The rotor shaft 219 carries a small magnet 221 which interacts with a Hall Effect sensor on the board 217 to provide information about the angular position of the rotor. This is used to synchronize the switching of the stator windings to ensure correct operation of the motor and generator in use. Alternatively, the control board 209 may sense current and voltage fluctuations in the windings to determine a suitable position and suitable synchronization for the switching of the stator windings.

With reference also to FIGS. 1 and 2, in addition to the control terminal 215, the ISG 1 has a positive output terminal 223. The body of the ISG 1 is used as the negative terminal and thus this simplifies packaging since the only connections required to be made to the machine are via the positive terminal and also via the control connector.

Figure 12B:
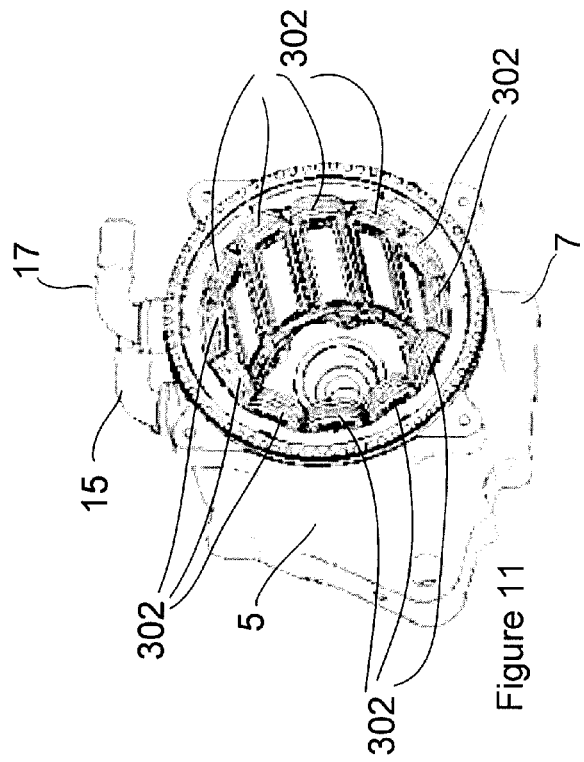
FIG. 12B shows a perspective view of the terminal of FIG. 12A.
Figure 12A:
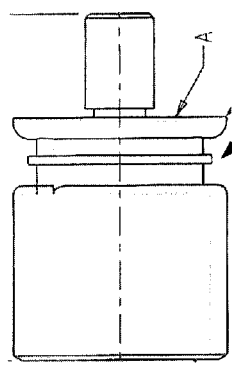
FIG. 12A shows an elevation of a high current terminal.
Figure 12C:
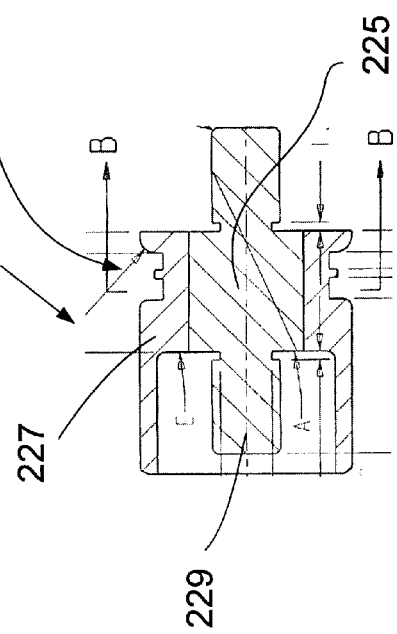
FIG. 12C shows a section through the terminal of FIG. 12A.
Figure 13:
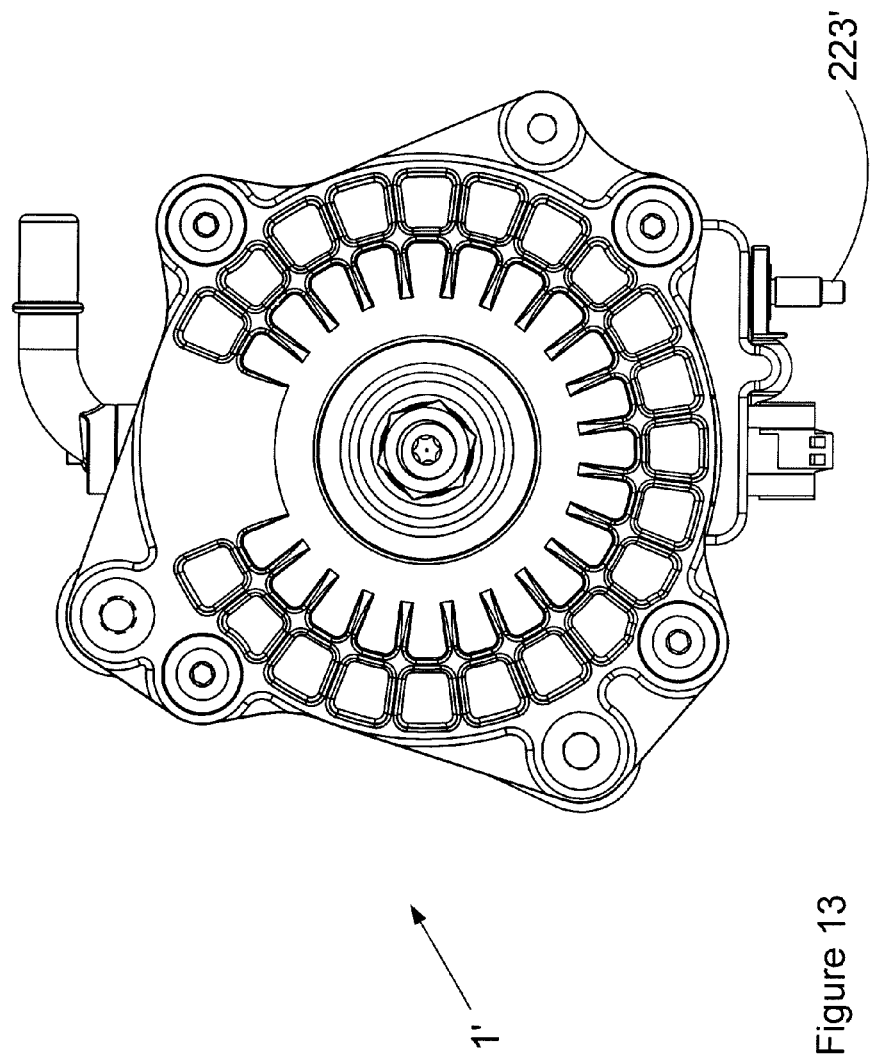
FIG. 13 shows a front elevation of an alternative ISG for the engine of a vehicle, comprising an alternatie B terminal.
Figure 14:
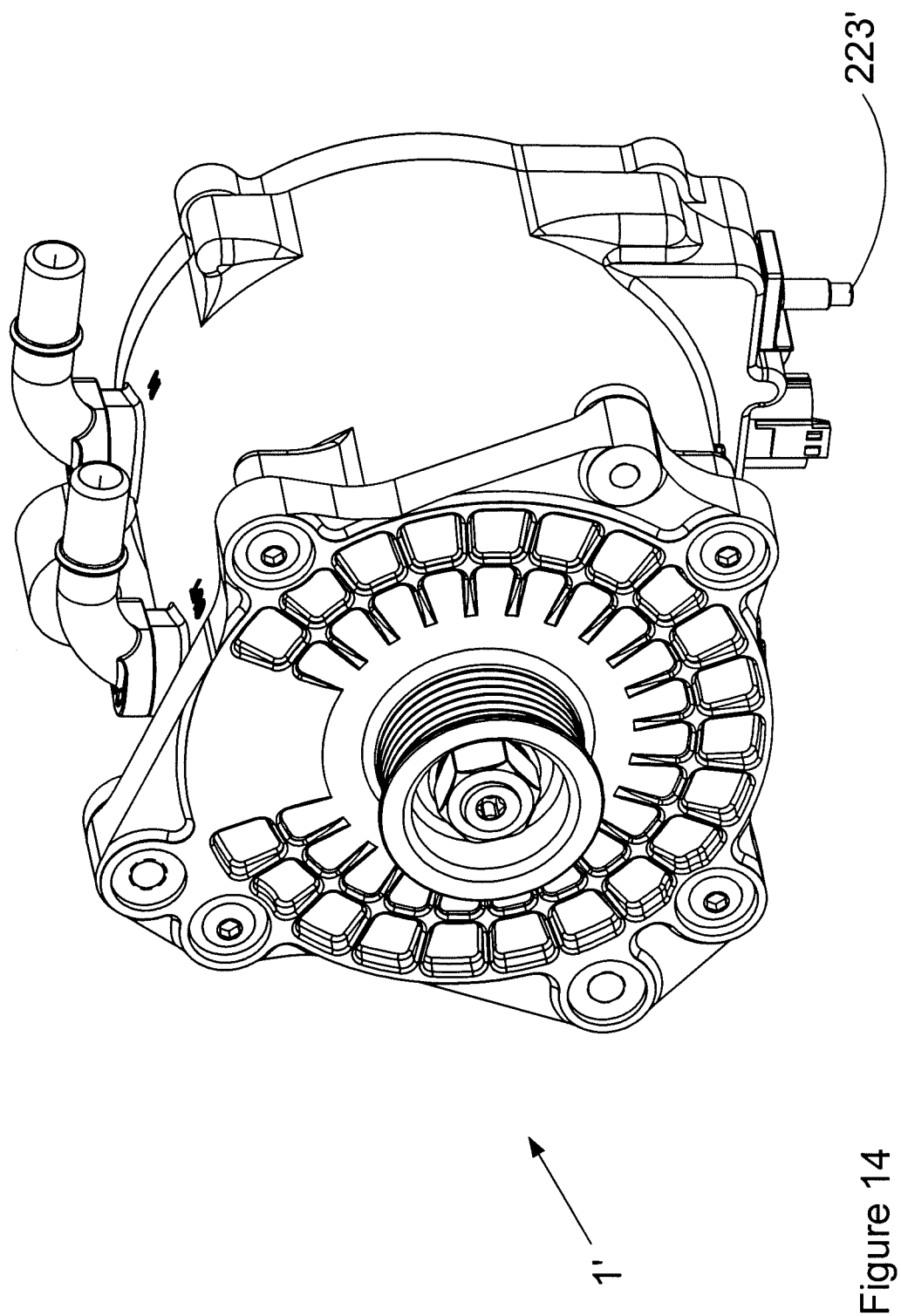
FIG. 14 shows a perspective view of the ISG of FIG. 13.
Figure 15B:
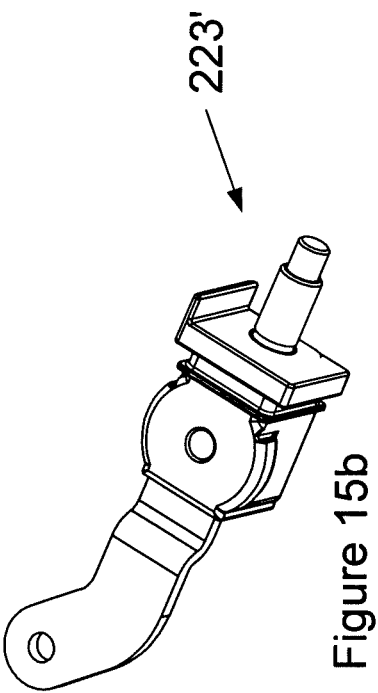
FIG. 15b shows a perspective view of the alternative B terminal of FIG. 13.
Figure 15C:
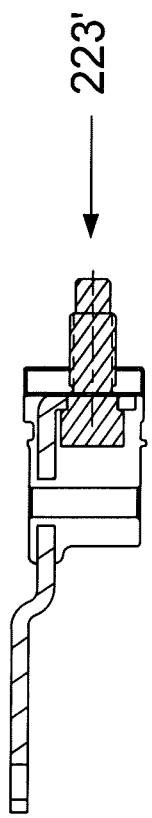
FIG. 15c shows a longitudinal cross-sectional view of the alternative B terminal of FIG. 13.
Figure 15A:
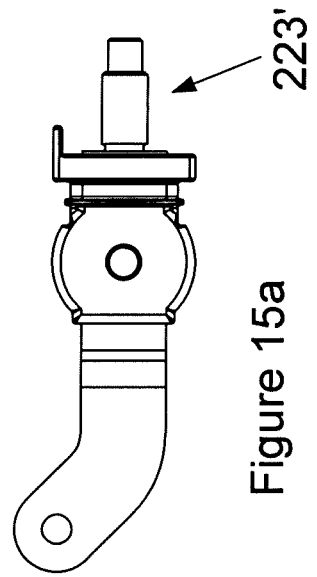
FIG. 15a shows an elevation of the alternative B terminal of FIG. 13.

With reference to FIGS. 12A, 12B and 12C, the terminal 223 includes a brass rod 225 which is designed to pass through an aperture in the housing of the ISG 1. The rod 225 is threaded at both ends so that it is connectable both to the power circuit 209 and also to the vehicle's electrical system and battery.

The power terminal 223 is surrounded by a bonded rubber portion 227. The rubber portion 227 serves to shield the outer part of the rod 229 so that when the ISG 1 is in position on a vehicle, the high current positive terminal is well protected from accidental shorting, and also the rubber forms a sealing portion 231 which is arranged to seal against the aperture in the housing 5.

The invention claimed is:

1. An integrated starter generator device comprising a housing, a switched, reluctance machine, and control electronics operable to configure the device as either a starter or generator,
   the switched reluctance machine comprising stator windings and a rotor contained within the housing,
   the control electronics being contained entirely within the housing,
   wherein
   the control electronics are operable to switch the stator windings of the switched reluctance machine;
   the control electronics include a power printed circuit board (PCB) having a peripheral edge;
   the stator windings are terminated within the housing at the said power PCB;
   the switching of the stator windings is carried out using power Field Effect Transistors (FETs); and
   the FETs are located around the periphery of the power PCB and are the components closest to the peripheral edge of the power PCB.

2. The device according to claim 1, wherein the FETs are thermally coupled to the housing via the power PCB and whereby the device is further arranged to cool the housing adjacent the FETs to remove heat from the FETs.

3. The device according to claim 1 wherein the power PCB carries a predetermined area of conductive material having a predetermined resistivity and cross section and wherein the output or input current in generator or motor operation respectively is caused to flow through the said area and whereby the current flow out of or into the device in the respective operating modes, is determinable by measuring the potential difference between predetermined positions on the said area.

4. The device according to claim 2 wherein the power PCB carries a predetermined area of conductive material having a predetermined resistivity and cross section and wherein the output or input current in generator or motor operation respectively is caused to flow through the said area and whereby the current flow out of or into the device in the respective operating modes, is determinable by measuring the potential difference between predetermined positions on the said area.

5. A device according to claim 3, wherein a plurality of high power capacitors are held on the power PCB (2) and are inserted and thermally coupled into wells formed in the housing material and whereby the device is further arranged to cool the wells to remove heat from the capacitors.

6. A device according to claim 3, wherein the power PCB further includes a multiway connector extending generally perpendicular to the plane of the board, and which is arranged to mechanically locate and electrically connect to a control PCB.

7. A device according to claim 5, wherein the power PCB further includes a multiway connector extending generally perpendicular to the plane of the board, and which is arranged to mechanically locate and electrically connect to a control PCB.

8. A device according to claim 6, wherein the control PCB is arranged to communicate with the power PCB to select between starter or generator operation.

9. A device according to claim 6, wherein the control PCB is arranged to communicate with an engine management system of a motor vehicle and wherein the control PCB includes a multiway connector which is couplable to a vehicle communications bus.

10. A device according to claim 6, wherein the control PCB is arranged to communicate with an engine management system of a motor vehicle and wherein the control PCB includes a multiway connector which is couplable to a vehicle communications bus.

11. A device according to claim 8, wherein the control PCB is arranged to communicate with an engine management system of a motor vehicle and wherein the control PCB includes a multiway connector which is couplable to a vehicle communications bus.

\* \* \* \* \*